United States Patent
Yamamoto et al.

(10) Patent No.: US 12,370,870 B2
(45) Date of Patent: Jul. 29, 2025

(54) DOOR IMPACT BEAM

(71) Applicant: SUBARU CORPORATION, Tokyo (JP)

(72) Inventors: Chihiro Yamamoto, Tokyo (JP);
Shunki Okajima, Tokyo (JP);
Shunsuke Soga, Tokyo (JP);
Yoshimasa Andou, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 176 days.

(21) Appl. No.: 18/319,668

(22) Filed: May 18, 2023

(65) Prior Publication Data

US 2023/0391170 A1 Dec. 7, 2023

(30) Foreign Application Priority Data

Jun. 7, 2022 (JP) .................................. 2022-092234

(51) Int. Cl.
*B60J 5/04* (2006.01)

(52) U.S. Cl.
CPC ............ *B60J 5/0443* (2013.01); *B60J 5/0425* (2013.01)

(58) Field of Classification Search
CPC ....... B60J 5/0443; B60J 5/0425; B60J 5/0422
USPC ..................................................... 296/146.6
See application file for complete search history.

(56) References Cited

U.S. PATENT DOCUMENTS

| | | | | |
|---|---|---|---|---|
| 6,096,403 A * | 8/2000 | Wycech | .............. | B29C 44/1228 428/35.8 |
| 6,679,540 B1 * | 1/2004 | Graber | ................... | B60J 5/0444 296/146.6 |
| 6,817,652 B2 * | 11/2004 | Graber | ................... | B60J 5/0447 296/187.02 |
| 6,942,281 B2 * | 9/2005 | Omori | .................... | B60J 5/0448 296/187.1 |
| 8,544,935 B2 * | 10/2013 | Wille | ..................... | B60J 5/0444 49/502 |
| 11,027,600 B2 * | 6/2021 | Schneider | .............. | B60J 5/0461 |

FOREIGN PATENT DOCUMENTS

JP 2008-254660 A 10/2008

* cited by examiner

*Primary Examiner* — Joseph D. Pape
(74) *Attorney, Agent, or Firm* — Smith, Gambrell & Russell, LLP (57) ABSTRACT

A door impact beam includes a top plate, a recessed bead, and walls. The top plate faces an outer panel that constitutes a door of the vehicle and extends in the front-rear direction of the vehicle. The recessed bead is disposed on the top plate and has a U shape toward an inner panel that constitutes the door of the vehicle. The walls protrude toward the inner panel from both ends of the top plate in a width direction of the top plate. The door impact beam is formed by press-molding a sheet-metal composite. The sheet-metal composite includes a sheet-metal main body and a reinforcing sheet metal overlapping with a part of the sheet-metal main body in a longitudinal direction. The door impact beam extends in a front-rear direction of the vehicle in an internal space formed by the outer panel and the inner panel.

17 Claims, 8 Drawing Sheets

DOOR IMPACT BEAM

CROSS-REFERENCE TO RELATED APPLICATIONS

The present application claims priority from Japanese Patent Application No. 2022-092234 filed on Jun. 7, 2022, the entire contents of which are hereby incorporated by reference.

BACKGROUND

The disclosure relates to a door impact beam provided as a reinforcing member for reducing deformation of a door due to a collision or the like.

In the related art, a door of a vehicle such as an automobile includes an outer panel and an inner panel. A door impact beam is disposed inside a space formed by the outer panel and the inner panel. The door impact beam is made of a steel material and extends in a front-rear direction of the vehicle. The door impact beam absorbs a collision load at the time of a side collision with the vehicle. Accordingly, the door impact beam reduces intrusion into a vehicle cabin due to deformation of the door. In general, the door impact beam is press-molded in a pipe shape or a substantially hat shape.

As a door impact beam for reducing deformation of a door against such a side collision with the vehicle, various techniques are proposed in the related art. For example, Japanese Unexamined Patent Application Publication (JP-A) No. 2008-254660 discloses a beam member (door impact beam) having a so-called corrugated plate shape formed by two beads and a flat part. The two beads have an open cross-sectional shape, and the flat part is formed between the two beads. In such a door impact beam, a buckling strength can be increased by multiple beads. Accordingly, the door impact beam in JP-A No. 2008-254660 can disperse and absorb a collision load in a wide area against a barrier side collision (a side collision with a bumper or the like of another vehicle). Therefore, the door impact beam in JP-A No. 2008-254660 serves as a reinforcing member for reducing deformation of a door effectively.

SUMMARY

An aspect of the disclosure provides a door impact beam. The door impact beam includes a top plate, a recessed bead, and walls. The top plate faces an outer panel that constitutes a door of the vehicle and extends in the front-rear direction of the vehicle. The recessed bead is disposed on the top plate and has a U shape toward an inner panel that constitutes the door of the vehicle. The walls protrude toward the inner panel from both ends of the top plate in a width direction of the top plate. The door impact beam is formed by press-molding a sheet-metal composite. The sheet-metal composite includes a sheet-metal main body and a reinforcing sheet metal overlapping with a part of the sheet-metal main body in a longitudinal direction. The door impact beam extends in a front-rear direction of the vehicle in an internal space formed by the outer panel and the inner panel.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Even when a door impact beam has a corrugated plate shape as in the technique disclosed in JP-A No. 2008-254660, when a large collision load is locally input, for example, in a pole side collision (a side collision with a pole-shaped object such as a utility pole), it may be difficult to exhibit a sufficient buckling strength. In such a case, the door impact beam may be locally buckled, and deformation of a door may not be sufficiently reduced.

It is desirable to provide a door impact beam capable of properly protecting an occupant from deformation of a door in both a barrier side collision and a pole side collision.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
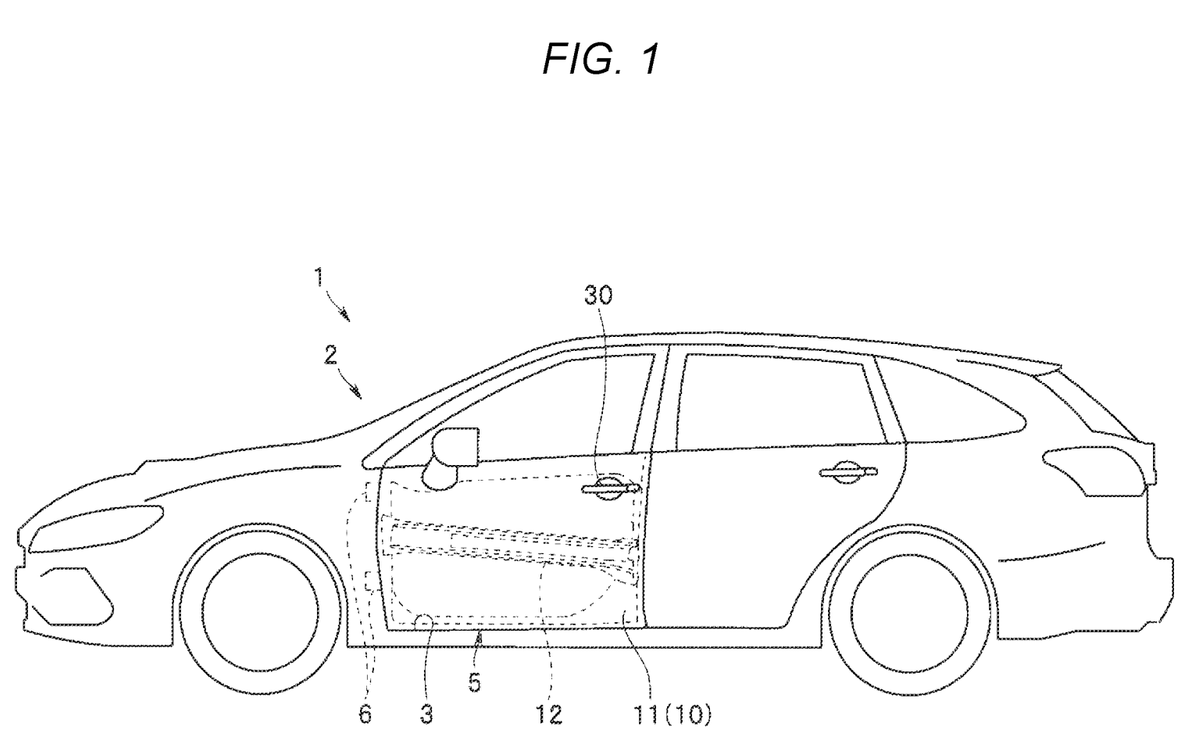
FIG. 1 is a left side view of a vehicle.
Figure 2:
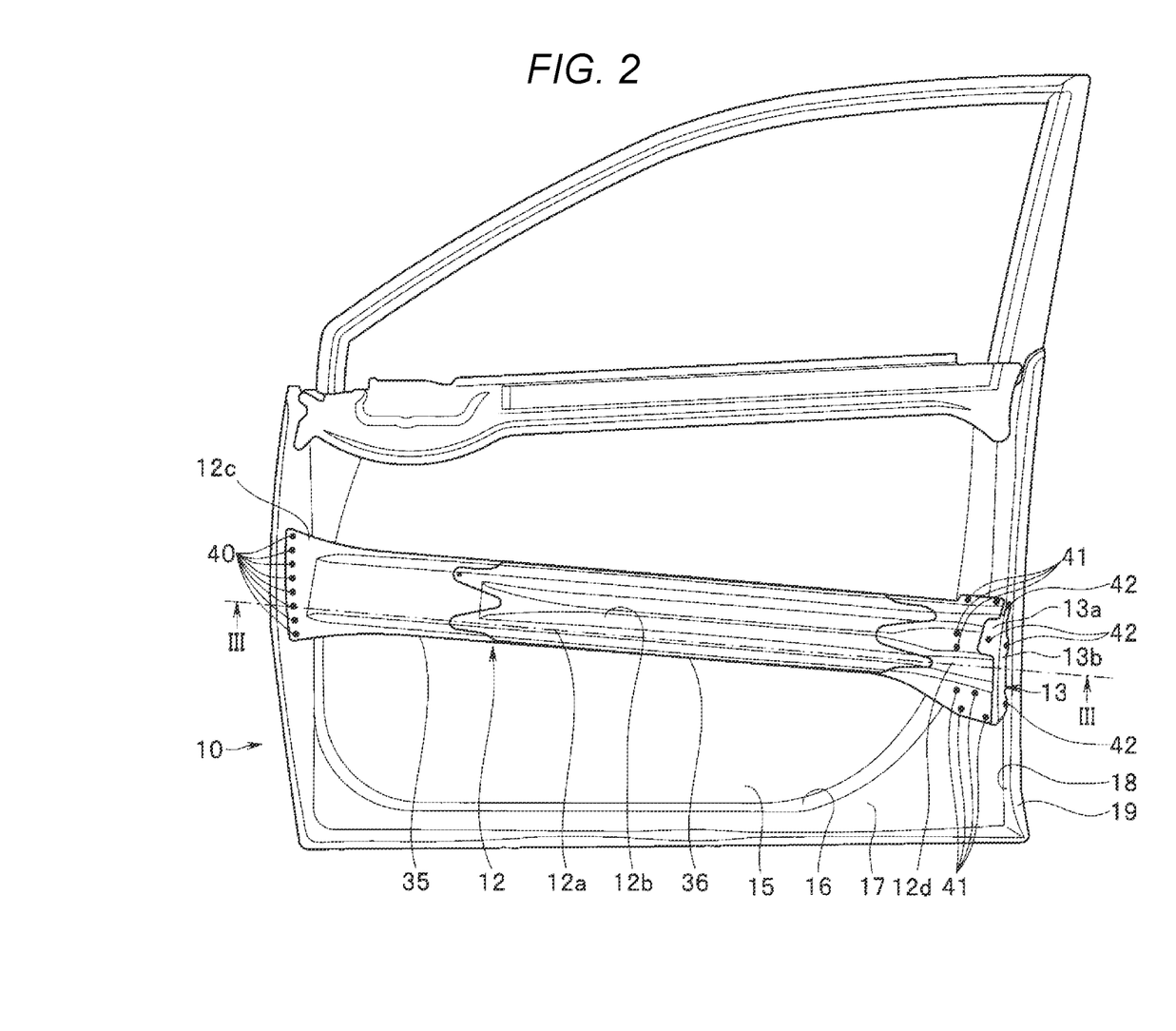
FIG. 2 is a side view of a side door with an outer panel removed.
Figure 3:
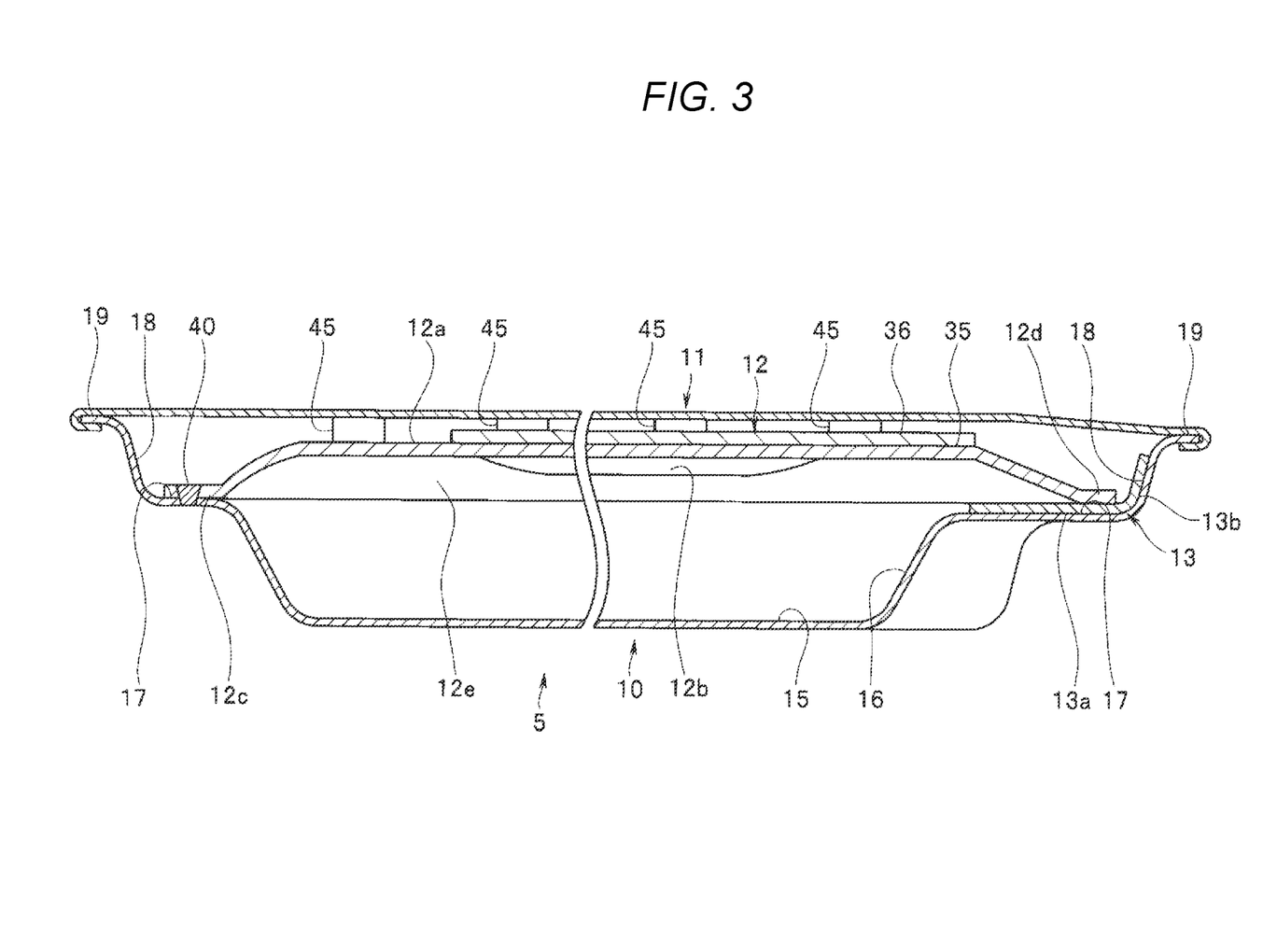
FIG. 3 is a cross-sectional view of a main part of the side door taken along a line III-III in FIG. 2.
Figure 4:
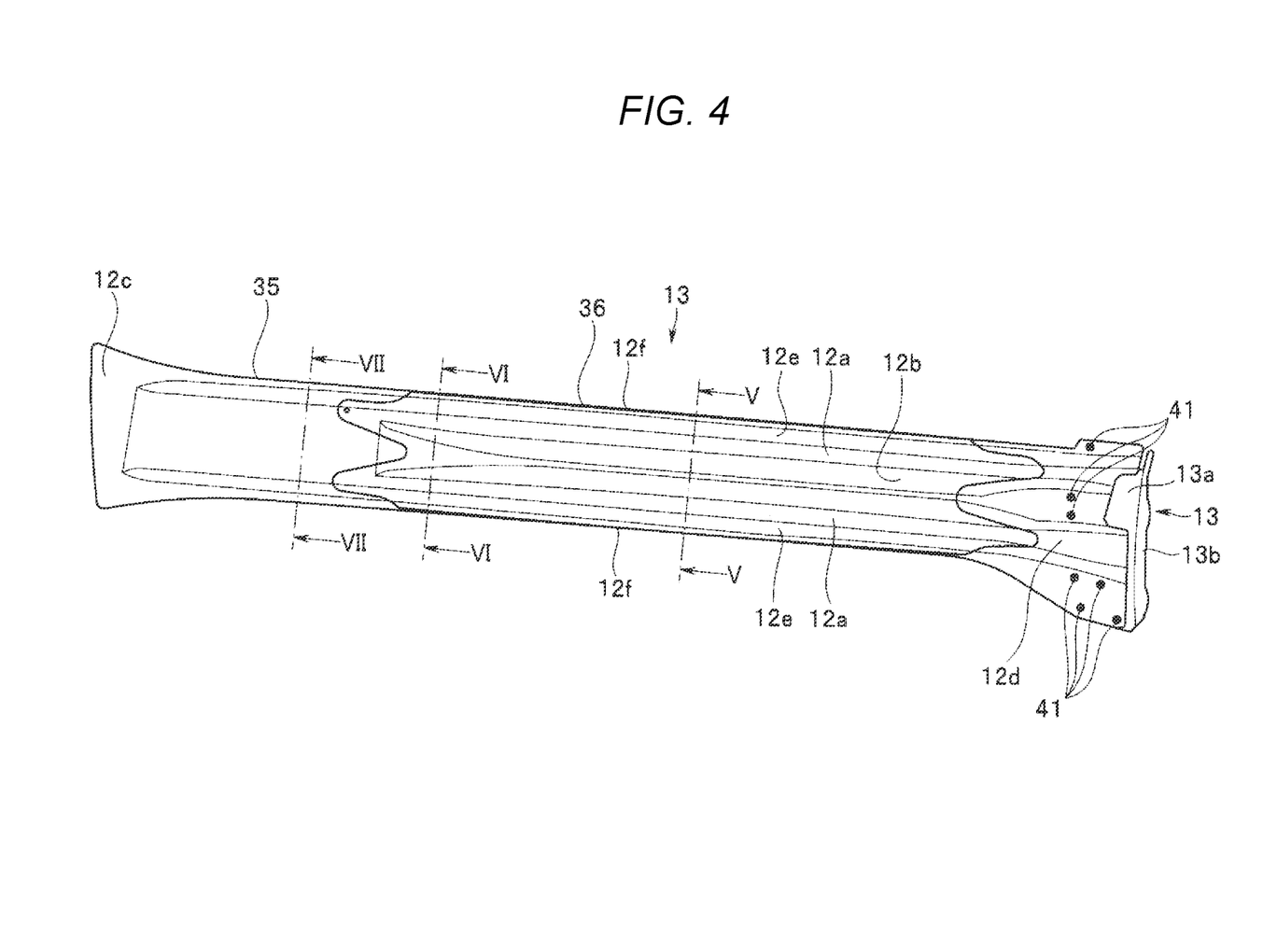
FIG. 4 is a side view of a door impact beam as seen from an outer side in a vehicle width direction.
Figure 5:
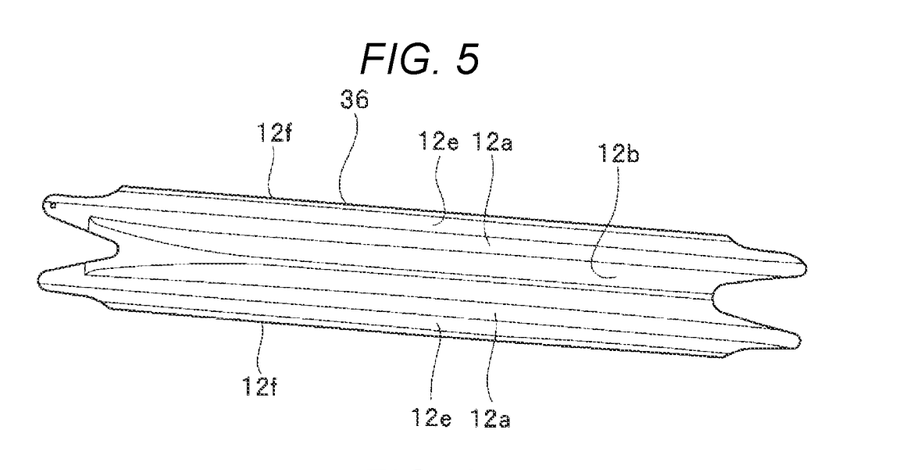
FIG. 5 is a side view of a reinforcing sheet metal of the door impact beam as seen from the outer side in the vehicle width direction.
Figure 6:
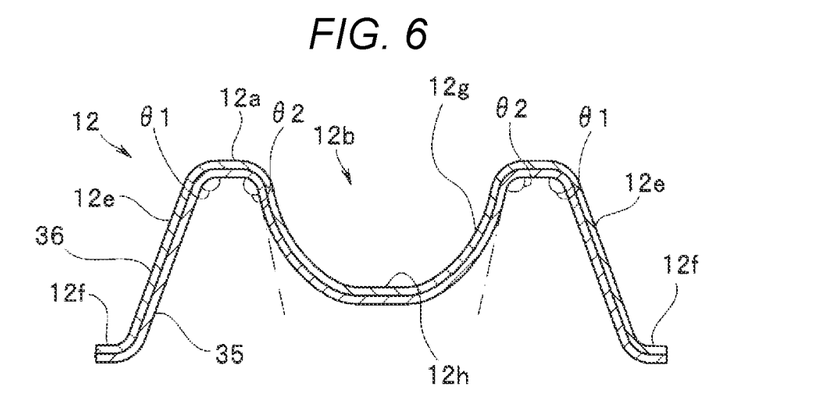
FIG. 6 is a cross-sectional view taken along a line V-V in FIG. 4.
Figure 7:
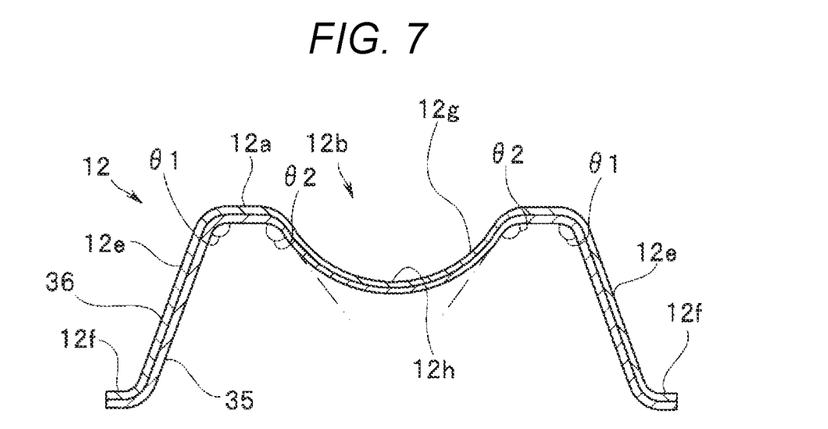
FIG. 7 is a cross-sectional view taken along a line VI-VI in FIG. 4.
Figure 8:
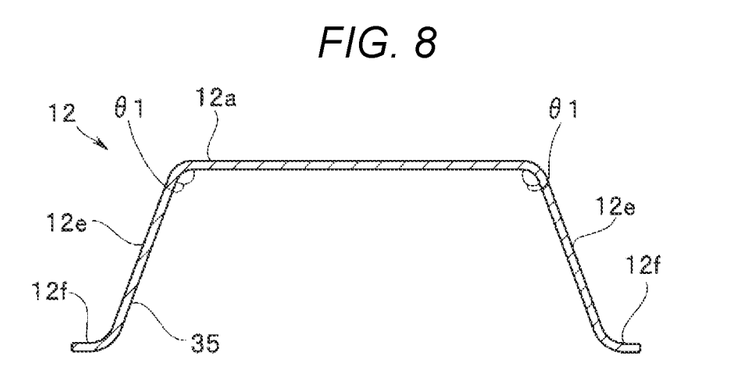
FIG. 8 is a cross-sectional view taken along a line VII-VII in FIG. 4.
Figure 9:
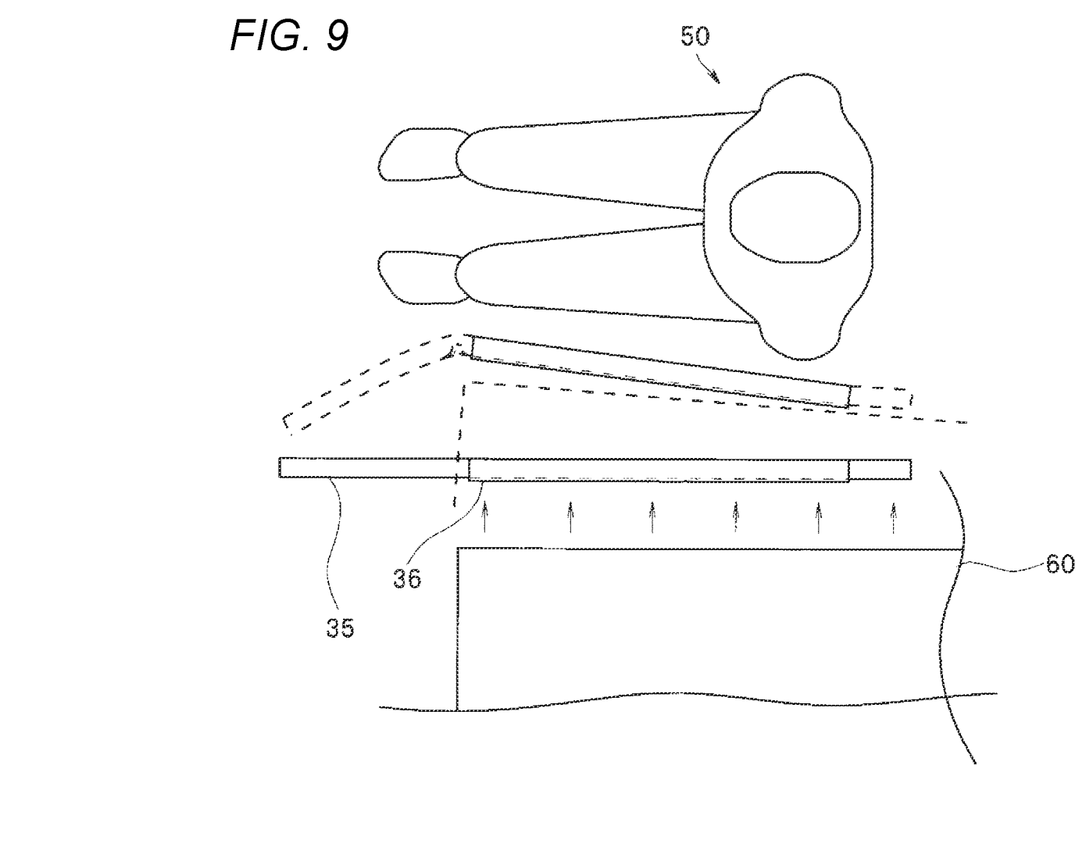
FIG. 9 is a plan view illustrating a barrier side collision state and placement of an occupant as seen from above.
Figure 10:
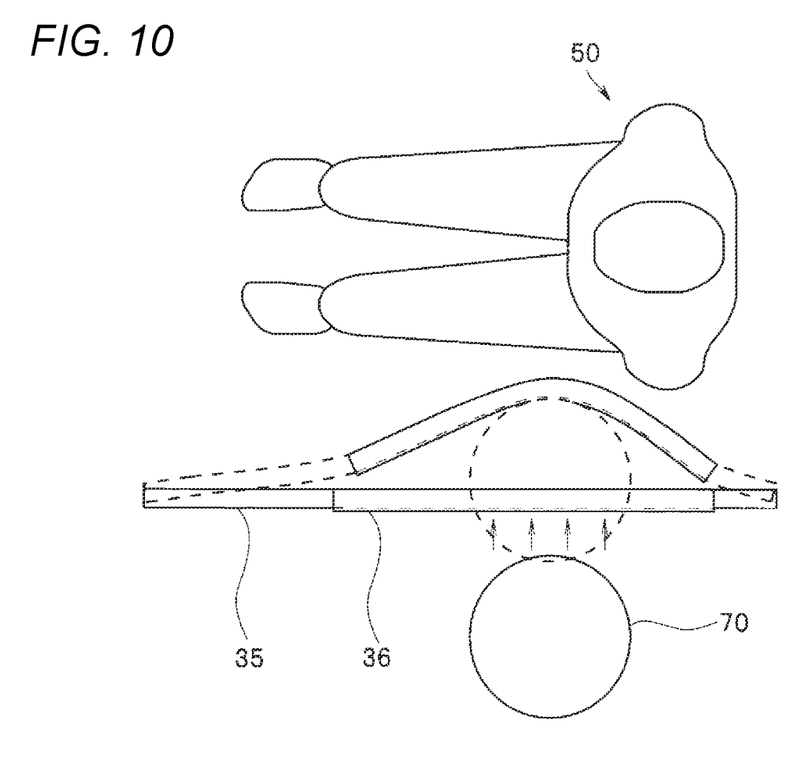
FIG. 10 is a plan view illustrating a pole side collision state and placement of an occupant as seen from above.

Regarding the drawings according to the embodiment of the disclosure, FIG. 1 is a left side view of a vehicle, FIG. 2 is a side view of a side door with an outer panel removed, FIG. 3 is a cross-sectional view of a main part of the side door taken along a line III-III in FIG. 2, FIG. 4 is a side view of a door impact beam as seen from an outer side in a vehicle width direction, FIG. 5 is a side view of a reinforcing sheet metal of the door impact beam as seen from the outer side in the vehicle width direction, FIG. 6 is a cross-sectional view taken along a line V-V in FIG. 4, FIG. 7 is a cross-sectional view taken along a line VI-VI in FIG. 4, FIG. 8 is a cross-sectional view taken along a line VII-VII in FIG. 4, FIG. 9 is a plan view illustrating a barrier side collision state and placement of an occupant as seen from above, and FIG. 10 is a plan view illustrating a pole side collision state and placement of an occupant as seen from above.

As an example of a configuration of a vehicle side door to which the door impact beam according to the embodiment is applied, a configuration of a front side door 5 (hereinafter, simply referred to as "door 5") will be described.

As illustrated in FIG. 1, a vehicle body 2 of a vehicle 1 includes a door opening 3 on the side of a front seat. The door opening 3 is provided with the door 5 for opening and closing the door opening 3.

The door 5 is, for example, a swing door that can swing in the vehicle width direction of the vehicle body 2. Therefore, a front part of the door 5 is supported by a front part of the door opening 3 via a pair of upper and lower hinges 6.

As illustrated in FIGS. 2 and 3, such a door 5 for a vehicle includes an inner panel 10, an outer panel 11, and a door impact beam 12.

The inner panel 10 is formed by pressing a sheet metal member made of a steel plate or the like. The inner panel 10 is disposed on an inner side of the door 5 in the vehicle width direction.

The inner panel 10 includes a side wall 15, a step 17, and an outward flange 19.

The side wall 15 protrudes toward the inner side of the door 5 in the vehicle width direction. The side wall 15 is formed at a position facing a side surface of a seat.

The step 17 is formed on an outer peripheral side of the side wall 15 and on an outer side of the side wall 15 in the vehicle width direction. The step 17 is substantially parallel to the side wall 15. The step 17 is coupled stepwise by a first relay wall 16 extending outward in the vehicle width direction from an outer peripheral end of the side wall 15.

The outward flange 19 is formed on an outer peripheral side of the step 17 and on an outer side of the step 17 in the vehicle width direction. The outward flange 19 is substantially parallel to the step 17. The outward flange 19 is coupled stepwise by a second relay wall 18 extending outward in the vehicle width direction from an outer peripheral end of the step 17. The outward flange 19 forms a front edge, a rear edge, and a lower edge of the inner panel 10.

The outer panel 11 is formed by pressing a sheet metal member made of a steel plate or the like. The outer panel 11 is disposed on an outer side of the door 5 in the vehicle width direction. A front edge, a rear edge, and a lower edge of the outer panel 11 are joined to the outward flange 19 of the inner panel 10 by a hemming process or the like.

An internal space is formed in the door 5 by such joining of the inner panel 10 and the outer panel 11.

Upper edges of the inner panel 10 and the outer panel 11 face each other and are folded inward of the door 5. An opening (not illustrated) through which window glass enters and exits is provided on an upper surface of the door 5.

A door handle 30 is attached to a rear part of the outer panel 11 on an outer surface side. The door handle 30 is coupled to a ratchet mechanism via a rod (neither is illustrated) inside the door 5.

As illustrated in FIGS. 1 to 3, the door impact beam 12 is disposed in the internal space of the door 5 along a front-rear direction of the vehicle body 2. The door impact beam 12 is provided to absorb a collision load in a side collision with the vehicle 1. That is, the door impact beam 12 reduces deformation of the door 5 due to a collision and reduces intrusion of the door 5 into a vehicle cabin.

As illustrated in FIGS. 2 to 5, the door impact beam 12 according to the embodiment is formed by press molding a sheet-metal composite including a sheet-metal main body 35 and a reinforcing sheet metal 36. The reinforcing sheet metal 36 overlaps an intermediate part of the sheet-metal main body 35 in a longitudinal direction.

For example, the sheet-metal main body 35 and the reinforcing sheet metal 36 are made of, for example, a high tensile strength steel plate having a thickness larger than that of the inner panel 10.

The sheet-metal main body 35 and the reinforcing sheet metal 36 are joined to each other by spot welding or the like.

Further, the sheet-metal main body 35 and the reinforcing sheet metal 36 are permanently molded by hot press molding.

With this molding, a basic shape of the door impact beam 12 is formed into a substantially hat shape in cross section in a region excluding a front end 12c in the longitudinal direction along the front-rear direction of the vehicle body 2 (see FIGS. 4 to 8). The front end 12c of the door impact beam 12 has a substantially flat plate shape.

That is, the door impact beam 12 includes a top plate 12a, a pair of walls 12e, and flanges 12f.

The top plate 12a protrudes so as to be close to and substantially face the outer panel 11. The top plate 12a extends in the longitudinal direction of the door impact beam 12.

Each of the walls 12e extends toward the inner panel 10 from both ends (upper and lower edges) of the top plate 12a in a lateral direction. The wall 12e extends in the longitudinal direction of the door impact beam 12.

Herein, an angle θ1 formed by each wall 12e with respect to the top plate 12a is set to be an obtuse angle. That is, the pair of walls 12e are inclined with respect to the top plate 12a so as to be separated from each other from an outer panel 11 side toward an inner panel 10 side.

Each of these walls 12e extends from the top plate 12a toward the inner panel 10 via a bent part, thereby stiffening the top plate 12a. Since the angle θ1 (inclination angle) formed by each wall 12e with respect to the top plate 12a is set to be an obtuse angle, when the collision load is input to the top plate 12a, a component force acts on each wall 12e in a direction of expanding (deploying) each bent part between the top plate 12a and each wall 12e. Accordingly, when a collision load equal to or greater than a predetermined value is applied to the top plate 12a, each wall 12e can be deformed in a direction of expanding the bent part.

Each flange 12f extends from an end of each wall 12e on an inner panel 10 side in a direction substantially parallel to the top plate 12a (that is, an up-down direction of the vehicle). The flanges 12f extend in the longitudinal direction of the door impact beam 12.

A recessed bead 12b is formed on the top plate 12a of the door impact beam 12 having such a basic shape in order to stiffen the top plate 12a.

The recessed bead 12b is formed at a substantially central part of the top plate 12a in the lateral direction (the up-down direction of the vehicle). As illustrated in FIGS. 2 and 4, the recessed bead 12b extends along the longitudinal direction of the door impact beam 12. A range within which the recessed bead 12b extends includes at least a region in which the reinforcing sheet metal 36 overlaps the sheet-metal main body 35.

The recessed bead 12b has a U shape protruding toward the inner panel 10. That is, an inclined wall 12g, which forms the recessed bead 12b, protrudes toward the inner panel 10 while being curved inward. In other words, the inclined wall 12g, which forms the recessed bead 12b, has a curved shape not having a bent shape midway.

Herein, a minimum inclination angle between the inclined wall 12g and the top plate 12a (a minimum value of an angle θ2 between the top plate 12a and a tangent line of the recessed bead 12b) is set to be an obtuse angle (see FIGS. 6 and 7). Due to such an inclination of the inclined wall 12g, when the collision load is input to the top plate 12a, a component force acts on the recessed bead 12b in a direction of expanding (deploying) the inclined wall 12g. Accordingly, when a collision load equal to or greater than the predetermined value is input to the top plate 12a, the inclined wall 12g can be deformed in the expanding direction.

A depth of the recessed bead 12b from the top plate 12a to a protruding end 12h (bottom) is set, for example, to be deepest at a substantially central part of the recessed bead 12b in the longitudinal direction (see FIG. 6), and to gradually become shallower toward both ends of the recessed bead 12b in the longitudinal direction (see FIG. 7). By changing the depth of the recessed bead 12b in this manner, rigidity at each position in the longitudinal direction of the door impact beam 12 is tuned. The maximum depth of the recessed bead 12b is set to be smaller than a length from the top plate 12a to the flange 12f.

The door impact beam 12 having such a configuration is inclined with respect to the inner panel 10 such that a rear end 12d is lower than the front end 12c of the door impact beam 12, and is bridged in the front-rear direction of the vehicle.

For example, the front end 12c of the door impact beam 12 overlaps and is in contact with the step 17, which is formed on a front part of the inner panel 10, from the outer side in the vehicle width direction. The front end 12c is joined to the inner panel 10 by spot welds 40 or the like while in surface contact with the step 17.

On the other hand, the rear end 12d of the door impact beam 12 overlaps and is joined to the step 17, which is formed on a rear part of the inner panel 10, via a bracket 13 from the outer side in the vehicle width direction.

The bracket 13 includes a sheet-metal joint 13a in contact with the rear end 12d of the sheet-metal main body 35 and a joint 13b in contact with the inner panel 10. The sheet-metal joint 13a has a shape substantially similar to a substantially hat shape of the rear end 12d in cross section. The sheet-metal joint 13a is joined to the rear end 12d of the sheet-metal main body 35 by spot welds 41 or the like while in surface contact with the rear end 12d.

The joint 13b has a substantially flat plate shape. The joint 13b is joined to the inner panel 10 by spot welds 42 or the like while in surface contact with the second relay wall 18. With these configurations, front and rear ends of the door impact beam 12 are firmly secured to the door 5.

In this manner, in the door impact beam 12 whose front and rear ends are coupled to the inner panel 10, the reinforcing sheet metal 36 is disposed at a position corresponding to the seat.

The top plate 12a of the door impact beam 12 is in contact with the outer panel 11 via a mastic sealer 45 (see FIG. 3).

According to such an embodiment, the door impact beam 12 is press-molded using the sheet-metal composite including the sheet-metal main body 35 and the reinforcing sheet metal 36 overlapping a part of the sheet-metal main body 35 in the longitudinal direction, extends in the front-rear direction of the vehicle in the internal space formed by the outer panel 11 and the inner panel 10 that constitute the door 5 of the vehicle, and includes the top plate 12a facing the outer panel 11 and extending in the front-rear direction of the vehicle, the recessed bead 12b formed on the top plate 12a and has a U shape toward the inner panel 10, and the walls 12e protruding toward the inner panel 10 from both ends of the top plate 12a in a width direction. With these configurations, the door impact beam 12 can properly protect the occupant from the deformation of the door 5 against both a barrier side collision and a pole side collision.

That is, the door impact beam 12 is molded by using, as a material, the sheet-metal composite including the reinforcing sheet metal 36, which reinforces a part of the sheet-metal main body 35 in the longitudinal direction. The top plate 12a of the door impact beam 12 is stiffened by the walls 12e that are formed on both ends of the top plate 12a in the width direction. Further, the U-shaped recessed bead 12b extending in the longitudinal direction is formed on the top plate 12a in order to stiffen the top plate 12a.

With these configurations, the door impact beam 12 can generate a sufficient beam drag force against the barrier side collision, in which a collision load from a bumper or the like of another vehicle is input to a predetermined range of a side surface of the vehicle 1 while being dispersed to some extent. Therefore, the door impact beam 12 can reduce the deformation of the door 5 toward the vehicle cabin (seat side) without being buckled. Then, the occupant can be properly protected by reducing the deformation of the door 5 toward the vehicle cabin in this manner.

When a collision load exceeding the beam drag force is input to the door impact beam 12 due to the barrier side collision, the door impact beam 12 can be buckled starting from a boundary of an end in the longitudinal direction (see FIG. 4) in which the reinforcing sheet metal 36 overlaps the sheet-metal main body 35 (see FIG. 9). Therefore, when this buckling position is appropriately set, even if the door impact beam 12 is buckled, the door impact beam 12 can be buckled at a position separated from a waist or the like of the occupant. By buckling the door impact beam 12 at such an appropriate position, even if the door 5 is deformed toward the vehicle cabin, the occupant can be properly protected.

For example, the reinforcing sheet metal 36 is disposed, with respect to the sheet-metal main body 35, at a position corresponding to the seat on which the occupant is to be seated. Accordingly, the beam drag force of the door impact beam 12 can be further improved in a region in which the occupant is to be seated. In the region in which the reinforcing sheet metal 36 of the door impact beam 12 overlaps, the occupant can be properly protected from the deformation of the door 5 without buckling even in the barrier side collision or the like.

Herein, the depth of the recessed bead 12b is deepest at the substantially central part in the front-rear direction of the vehicle and gradually becomes shallower toward the both ends in the longitudinal direction. With such a configuration, the beam drag force of the door impact beam 12 can be improved in consideration of a moment that acts on the elongated door impact beam 12 or the like.

A buckling start position is set outside the region corresponding to the seat of the occupant. That is, a bending point due to buckling can be controlled to a position not facing toward the occupant. Accordingly, even when the door 5 is deformed, the reinforcing sheet metal 36 can reduce an influence of the deformation of the door 5 on the occupant.

On the other hand, the door impact beam 12 can be deformed while absorbing a collision load in the pole side collision in which the collision load from a utility pole or the like is locally concentrated on and input to the side surface of the vehicle 1.

That is, the recessed bead 12b has a substantially U shape in cross section, and there is no bent part inside the recessed bead 12b. Therefore, when a collision load equal to or greater than the predetermined value is input, the recessed bead 12b can be deformed in the expanding (deploying) direction while the inclined wall 12g is not curved by the collision load received from the top plate 12a. That is, at the time of a local collision such as the pole side collision, the recessed bead 12b expands in the lateral direction (up-down direction) of the door impact beam 12, thereby reducing the beam drag force.

Similarly, bent parts between the top plate 12a and the walls 12e expand in the lateral direction (up-down direction) of the door impact beam 12, thereby reducing the beam drag force by the walls 12e.

Thus, the door impact beam 12 can be deformed while absorbing the collision load so as to wrap around an object without being locally buckled (see FIG. 10). This absorption of the collision load due to the deformation of the door impact beam 12 reduces a deformation amount of the door impact beam 12 toward the vehicle cabin as compared with the case where the door impact beam 12 is buckled. Therefore, the door impact beam 12 can reduce the deformation of the door 5 toward the vehicle cabin. Then, the occupant can be properly protected from the deformation of the door 5 by reducing the deformation of the door 5 toward the vehicle cabin in this manner.

In the embodiment, an example is described in which the reinforcing sheet metal 36 overlaps the sheet-metal main body 35 from the outer side in the vehicle width direction. Alternatively, the reinforcing sheet metal 36 may overlap the sheet-metal main body 35 from an inner side in the vehicle width direction.

In the embodiment, an example is described in which the door impact beam 12 of the vehicle 1 is applied to the front side door 5. Alternatively, the door impact beam 12 may be applied to another position in a vehicle door.

The disclosure in the above embodiment is not to be limited to the described modes and may be modified in various manners at an implementation stage without departing from the subject matter. Further, the above embodiment includes disclosures at various stages, and various disclosures can be extracted from appropriate combinations of multiple disclosed elements.

When the above-described problems are solved and the above-described effects are obtained even if some elements are removed from all elements described in the above embodiment, a configuration from which some elements are removed can be extracted as an aspect of the disclosure.

The invention claimed is:

1. A door impact beam for a vehicle, the door impact beam comprising:
 a top plate facing an outer panel that constitutes a door of the vehicle and extending in the front-rear direction of the vehicle;
 a recessed bead disposed on the top plate and having a U shape toward an inner panel that constitutes the door of the vehicle; and
 walls protruding toward the inner panel from both ends of the top plate in a width direction of the top plate, wherein
 the door impact beam is formed by press-molding a sheet-metal composite,
 the sheet-metal composite includes a sheet-metal main body and a reinforcing sheet metal overlapping with a part of the sheet-metal main body in a longitudinal direction, and the door impact beam extends in a front-rear direction of the vehicle in an internal space formed by the outer panel and the inner panel, and wherein the sheet-metal main body is the longest component of the door impact beam; and, as the door impact beam is formed by press-molding the sheet-metal composite, the reinforcing sheet metal overlapping the sheet-metal main body has a common cross-sectional shape as that of the sheet-metal main body as to be fully flush with the main body over an entire lateral direction of the reinforcing sheet metal.

2. The door impact beam according to claim 1, wherein the recessed bead comprises a curved surface.

3. The door impact beam according to claim 1, wherein the reinforcing sheet metal of the door impact beam is disposed at a position corresponding to a side surface of a seat of the vehicle.

4. The door impact beam according to claim 2, wherein the reinforcing sheet metal of the door impact beam is disposed at a position corresponding to a side surface of a seat of the vehicle.

5. The door impact beam according to claim 1, wherein the recessed bead has a shape such that a depth from an opening to a bottom surface is deepest at a substantially central part in the front-rear direction of the vehicle and gradually becomes shallower toward both ends in the longitudinal direction.

6. The door impact beam according to claim 2, wherein the recessed bead has a shape such that a depth from an opening to a bottom surface is deepest at a substantially central part in the front-rear direction of the vehicle and gradually becomes shallower toward both ends in the longitudinal direction.

7. The door impact beam according to claim 5, wherein a maximum bead depth is less than a height extension of the walls protruding toward the inner panel such that a cross-section of the central part of the impact beam has a hat shape.

8. The door impact beam according to claim 1, wherein a maximum bead depth is less than a height extension of the walls protruding toward the inner panel such that a cross-section of the impact beam has a hat shape at a location of the maximum bead depth.

9. A door impact beam for a vehicle, the door impact beam comprising:
 a top plate facing an outer panel that constitutes a door of the vehicle and extending in the front-rear direction of the vehicle;
 a recessed bead disposed on the top plate and having a U shape toward an inner panel that constitutes the door of the vehicle; and
 walls protruding toward the inner panel from both ends of the top plate in a width direction of the top plate, wherein
 the door impact beam is formed by press-molding a sheet-metal composite,
 the sheet-metal composite includes a sheet-metal main body and a reinforcing sheet metal overlapping with a part of the sheet-metal main body in a longitudinal direction, and
 the door impact beam extends in a front-rear direction of the vehicle in an internal space formed by the outer panel and the inner panel, wherein the recessed bead has a shape such that a depth from an opening to a bottom surface is deepest at a substantially central part of the door impact beam in the front-rear direction of the vehicle and gradually becomes shallower toward both ends in the longitudinal direction, and wherein a maximum bead depth is set to be less than a height extension of the walls extending away from the top plate and toward the inner panel such that a cross-section of the central part of the impact beam has a hat shape.

10. The door impact beam according to claim 9, wherein the recessed bead comprises a curved surface.

11. The door impact beam according to claim 9, wherein the reinforcing sheet metal of the door impact beam is disposed at a position corresponding to a side surface of a seat of the vehicle.

12. The door impact beam according to claim 1, wherein the sheet-metal main body, in extending in the front-rear direction of the vehicle, has an end that has a substantially flat plate shape.

13. The door impact beam according to claim 9, wherein the sheet-metal main body, in extending in the front-rear direction of the vehicle, has an end that has a substantially flat plate shape.

14. The door impact beam according to claim 1, wherein the bead has a fully curved surface as to avoid any bend region in the bead in extending from one end to an opposite end of the bead in a widthwise direction.

15. The door impact beam according to claim 9, wherein the bead has a fully curved surface as to avoid any bend region in the bead in extending from one end to an opposite end of the bead in a widthwise direction.

16. The door impact beam according to claim 1, wherein the sheet-metal main body and the reinforcing sheet metal are joined to each other with a spot weld.

17. The door impact beam according to claim 9, wherein the sheet-metal main body and the reinforcing sheet metal are joined to each other with a spot weld.

\* \* \* \* \*